(12) United States Patent
Hakami

(10) Patent No.: US 6,748,411 B1
(45) Date of Patent: Jun. 8, 2004

(54) HIERARCHICAL CARRY-SELECT MULTIPLE-INPUT SPLIT ADDER

(75) Inventor: Mohammad Reza Hakami, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 592 days.

(21) Appl. No.: 09/716,474

(22) Filed: Nov. 20, 2000

(51) Int. Cl.$^7$ .............................. G06F 7/38; G06F 7/50
(52) U.S. Cl. ...................................... 708/518; 708/709
(58) Field of Search ............................. 708/518, 709, 708/714

(56) References Cited

U.S. PATENT DOCUMENTS

| | | | |
|---|---|---|---|
| 4,041,461 A | 8/1977 | Kratz et al. ................. 364/200 |
| 4,354,249 A | 10/1982 | King et al. ................. 364/754 |
| 4,490,807 A | 12/1984 | Chevillat .................... 364/736 |
| 4,525,797 A | 6/1985 | Holden ....................... 364/788 |
| 4,707,800 A * | 11/1987 | Montrone et al. .......... 708/518 |
| 4,768,160 A * | 8/1988 | Yokoyama .................. 708/518 |
| 4,852,037 A | 7/1989 | Aoki .......................... 364/736 |
| 4,872,131 A | 10/1989 | Kubota ....................... 364/736 |
| 4,903,225 A | 2/1990 | Brost ....................... 364/728.03 |
| 4,945,507 A | 7/1990 | Ishida ......................... 364/737 |
| 4,949,292 A | 8/1990 | Hoshino ..................... 364/736 |
| 4,970,677 A | 11/1990 | Young ........................ 364/784 |
| 4,996,661 A | 2/1991 | Cox ........................... 364/748 |
| 5,018,093 A | 5/1991 | Shih .......................... 364/740 |
| 5,027,312 A | 6/1991 | Knauer et al. .............. 364/788 |
| 5,101,372 A | 3/1992 | Heaslip ...................... 364/758 |
| 5,103,419 A | 4/1992 | Toyokura ................. 364/750.5 |
| 5,175,702 A | 12/1992 | Beraud et al. .............. 364/736 |
| 5,206,827 A | 4/1993 | Tsuruta ....................... 364/767 |
| 5,278,781 A | 1/1994 | Aoso et al. ................. 364/736 |
| 5,327,369 A * | 7/1994 | Ashkenazi .................. 708/518 |
| 5,351,207 A | 9/1994 | Girard ........................ 364/786 |
| 5,390,135 A * | 2/1995 | Lee et al. ................... 708/518 |
| 5,442,580 A | 8/1995 | Fettweis ..................... 364/736 |
| 5,448,509 A | 9/1995 | Lee ............................ 364/737 |
| 5,475,824 A | 12/1995 | Grochowski et al. ........ 395/375 |
| 5,522,085 A | 5/1996 | Harrison et al. ............. 395/800 |
| 5,600,847 A | 2/1997 | Guttag et al. ............... 395/800 |
| 5,631,860 A | 5/1997 | Morinaka .................... 364/787 |
| 5,684,728 A | 11/1997 | Okayama ................. 364/734.5 |
| 5,757,685 A * | 5/1998 | Ohuchi ....................... 708/518 |
| 5,883,824 A * | 3/1999 | Lee et al. ................... 708/518 |
| 5,889,689 A | 3/1999 | Alidina ................... 364/745.03 |
| 5,933,362 A * | 8/1999 | Inoue ......................... 708/711 |
| 5,987,490 A | 11/1999 | Alidina et al. .............. 708/523 |
| 6,003,125 A * | 12/1999 | Shippy ....................... 708/518 |
| 6,449,629 B1 * | 9/2002 | Morgan ...................... 708/518 |
| 6,584,484 B1 * | 6/2003 | Aoki et al. .................. 708/709 |

FOREIGN PATENT DOCUMENTS

| | | | | |
|---|---|---|---|---|
| EP | 0 530 936 A1 | 9/1991 | ............ G06F/7/52 |
| EP | 0 654 733 A1 | 11/1993 | ........... G06F/9/302 |
| EP | 0 660 245 A2 | 12/1993 | ........... G06F/17/10 |
| EP | 0 615 199 A | 9/1994 | ........ G06F/15/332 |
| GB | 2 319 152 A | 5/1998 | ........... H04L/25/03 |
| WO | PCT WO 98.35301 | 2/1998 | ........... G06F/17/10 |

OTHER PUBLICATIONS

European Standard Search Report—Dated: Mar. 4, 1999.
European Standard Search Report—Dated: Aug. 18, 2000.
European Standard Search Report—Dated: Mar. 27, 1997.
Patent Abstracts of Japan, dated Dec. 23, 1977 to Fujitsu Ltd.
Patent Abstracts of Japan, dated Nov. 13, 1986 to Mitsubishi Electric Corp.
"Viterbi Decoding Techniques In The TMS320C54X Family", Texas Instrument, Henry Hendrix, Jun. 1996, pp. 1–19.
"Superscaler Processor Delivers 400 MIPS For DSP and Control Needs", pp. 37–42
"Computer Arithmetic Algorithms," Brookside Court Publishers, Amherst, Massachusetts 01002, Israel Koren, 1998.

* cited by examiner

Primary Examiner—Tan V. Mai

(57) ABSTRACT

An adder or an integrated circuit including an adder, includes a hierarchical carry-select split adder capable of operating in a split mode of operation when a mode select input takes on a first state. It is also capable of operating in a hierarchical carry-select mode of operation when the mode select input takes on a second state.

15 Claims, 2 Drawing Sheets

HIERARCHICAL CARRY-SELECT MULTIPLE-INPUT SPLIT ADDER

TECHNICAL FIELD

This invention relates generally to integrated circuits, and more particularly to multiple input split adders capable of a split-add operation wherein two sets of operands are added simultaneously to increase computational throughput in a split add mode or capable of a hierarchical carry-select add operation to increase computational throughput in a hierarchical carry select add mode.

BACKGROUND OF THE INVENTION

Addition forms the basis of many processing operations including counting, subtraction, multiplication, and filtering. A wide variety of adder circuits that add binary numbers provide an implementation with a trade-off between the speed of completing the addition operation and the amount of hardware, as measured by area required on an integrated circuit, to complete an addition operation. While three binary number representations are available, sign-magnitude, one's complement, and two's complement, computations are more efficient using the two's complement number representation. Adders can be used to accomplish subtraction by generating the two's complement of the subtrahend and adding the minuend. The two's complement of the subtrahend can be generated internal to the adder by providing the subtrahend in one's complement representation and adding one using the carry-in input to the adder.

A split adder is an adder that is capable of operating in a non-split mode on operands having a relatively large number of bits, and in split mode is capable of operating as more than one adder on operands having relatively fewer bits. In split mode operation, input vectors may be portioned into smaller vectors. The smaller vectors may be of the same number of bits or a different number of bits. In split mode operation, the operands to each adder comprising the split adder may be independent of other operands. Split adders are employed to take advantage of existing hardware where a tradeoff between precision and the number of adders can be made, and to gain additional computational throughput without requiring additional hardware. Split-adders in which the most significant bit portion of two operands are added in a first portion of an adder, and the least significant bit portions of two operands are added in a second portion of an adder are known. Known split-adders, however, can not accommodate more than two operands as inputs or hierarchical carry-select addition.

SUMMARY OF THE INVENTION

In accordance with the invention, an adder or an integrated circuit including an adder, includes a hierarchical carry-select split adder capable of operating in a split mode of operation when a mode select input takes on a first state, and is capable of operating in a hierarchical carry-select mode of operation when the mode select input takes on a second state.

DETAILED DESCRIPTION

Figure 1:
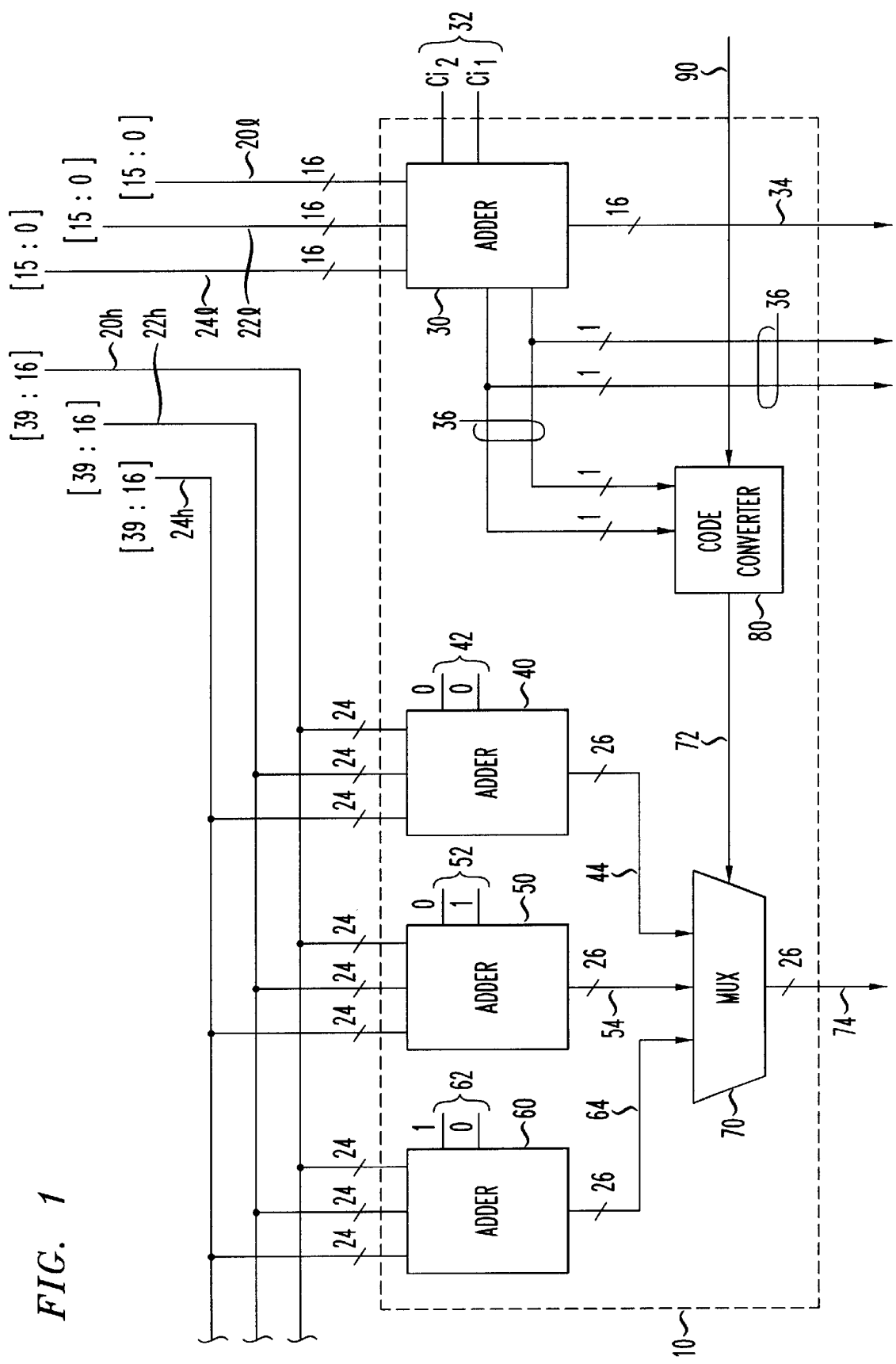
FIG. 1 is a schematic diagram of a portion of an integrated circuit that is an illustrative embodiment of an adder in accordance with the present invention.
Figure 2:
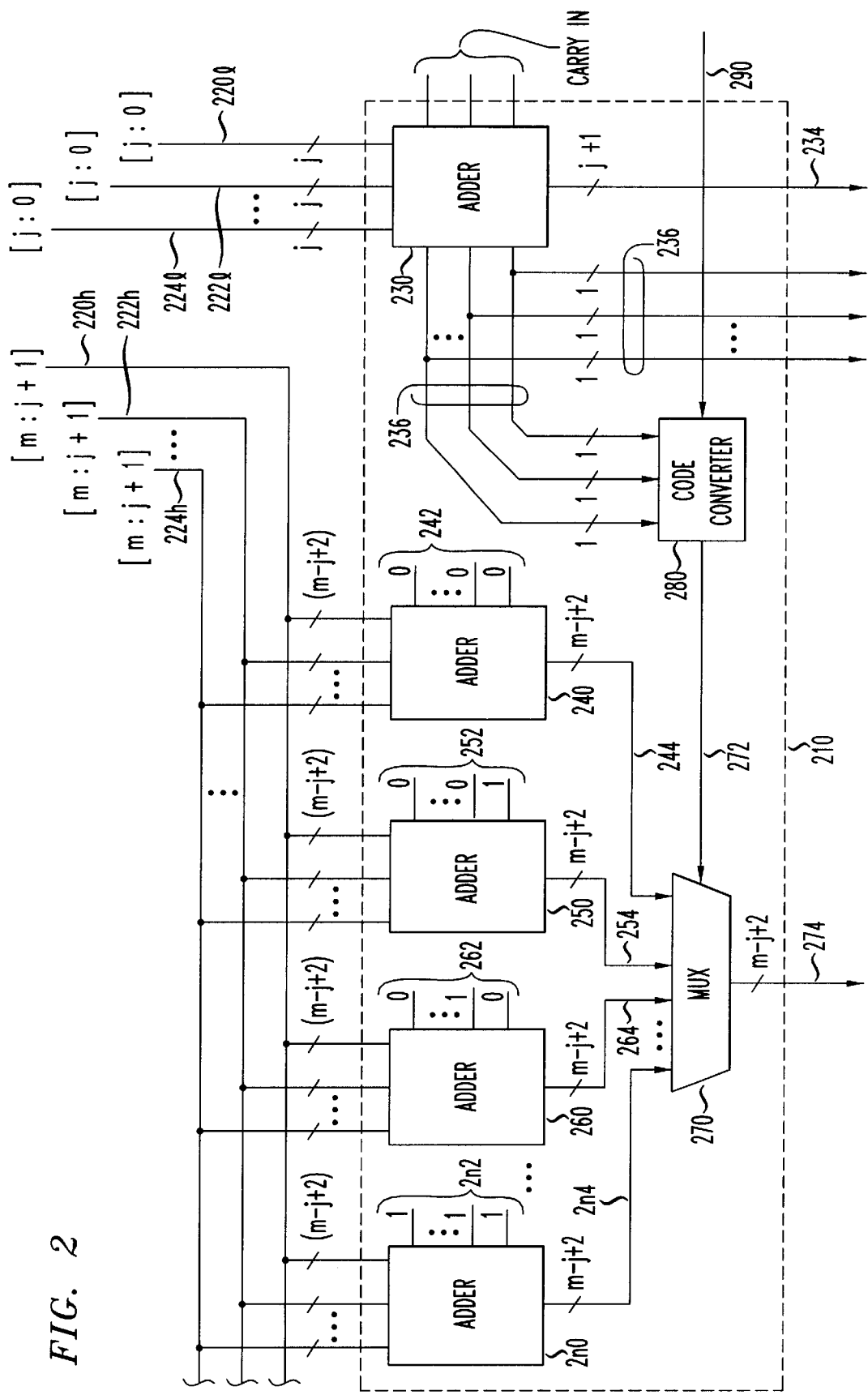
FIG. 2 is a schematic diagram of a portion of an integrated circuit that is a more generalized embodiment of an adder in accordance with the present invention.

A schematic diagram of an illustrative embodiment of a multiple input hierarchical carry-select split adder 10 in which there are three operands is shown in FIG. 1. Adder 10 may be fabricated as part of an integrated circuit, such as a microprocessor, microcontroller, or digital signal processor. An example will be described in which adder 10 is a three operand input adder and the operands are 40 bits wide with a split between bits 15 and 16, although the invention is not limited to having three inputs, 40 bit wide operands or a split in the operands between bits 15 and 16. Subsequent to describing this example, a more general example as shown in FIG. 2 will be described.

Multiple bit operands 20, 22, and 24 are provided as inputs to adder 10. Operands 20, 22, and 24 each have 40 bits including a sign bit in the most significant bit position, and may have guard bits. The bits of each operand represent a numerical quantity which may be in any form such as binary, one's-complement, or two's-complement.

Adder 10 may be comprised of more than one multiple input adder. For example, adder 10 may be comprised of adders 30, 40, 50, and 60. The bits in bit positions below the split in the width of the operands are the less significant bits. The less significant bits of each operand 20, 22, and 24, denoted respectively, 20$l$, 22$l$, and 24$l$, are provided to adder 30. The bits in bit position above the split in the width of the operands are the more significant bits. The more significant bits of each operand 20, 22, and 24, denoted respectively 20$h$, 22$h$, and 24$h$, are provided as inputs to each of adders 40, 50, and 60.

Each adder 30, 40, 50, and 60 typically receives as many carry-in inputs as it provides carry-out outputs. Typically, the number of carry-in inputs and carry-out outputs is one less than the number of operand inputs. The operands may be compressed from I in number to two inputs by an I:2 compressor, not shown, as is known in the art. See, for example, *Computer Arithmetic Algorithms* by I. Koren, the disclosure of which is hereby incorporated by reference.

The less significant bits of each of the operands to be added are provided to adder 30 and the more significant bits of the operands to be added are provided to adders 40, 50, and 60.

Adder 30 operating as a three-input adder is a multiple-bit adder that receives inputs 20$l$, 22$l$, and 24$l$, and carry-in inputs 32. Adder 30 adds the inputs and provides a multiple-bit sum 34 as an output that is a sum of the inputs. Adder 30 also provides carry-out outputs 36.

Each of adder 40, 50, and 60 are multiple-bit adders that receive inputs 20$h$, 22$h$, and 24$h$. Each of adders 40, 50, and 60 also receive respectively carry-in inputs 42, 52, and 62. Carry-in inputs 42, 52, and 62 may be hard wired. In one embodiment with adders 40, 50, and 60 having three inputs, carry-in input 42 is $00_2$, carry input 52 is $01_2$, and carry input 62 is $10_2$. A carry-in of $11_2$ is not expected. Each of adders 40, 50, and 60 adds the respective operand inputs and carry-in inputs and provides a respective multiple-bit sum 44, 54, and 64, as an output that is a sum of the inputs.

Multiple-bit sums 44, 54, and 64 are provided as inputs to multiplexer 70. Select input 72 selects one of the inputs to multiplexer 70 as its output 74.

Adder 10 can operate in a split-mode or a hierarchical carry-select mode. An adder mode select input 90 determines in which mode of operation adder 10 operates.

In the split mode of operation, mode select input 90 takes on a first state, such as a logic high or a logic low, and adder 10 performs two additions (or subtractions or some combination thereof) that are independent of each other. In the split mode of adder 10 operation, operands 20*l* and 20*h* represent independent operands, as do operands 22*l* and 22*h*, and 24*l* and 24*h*. The number of possible combinations of the carry-out bits from the lesser significant bits sum in adder 30 will determine the number of adders required to operate in parallel with adder 30. For three operand inputs of 40 bits or less, the possible carry-out bit combinations are $00_2$, $01_2$, or $10_2$, necessitating three adders 40, 50, and 60. Operands 20*l*, 22*l*, and 24*l* are independent of operands 20*h*, 22*h*, and 24*h* and are added in adder 30. The sum of operands 20*l*, 22*l*, and 24*l* is provided as output 34, and the carry-out bits are provided as carry-out output 36. Operands 20*h*, 22*h*, and 24*h* are independent of operands 20*l*, 22*l* and 24*l* and are added in adder 40 having carry-in inputs that are $00_2$. Adders 50 and 60 may not be powered to save energy. The sum of operands 20*h*, 22*h*, and 24*h* includes carry-out bits and is provided as output 44. Mode select input 90, the operation of which is described in greater detail below, causes code converter 80 to generate a select input 72. Select input 72 causes multiplexer 70 to select output 44, which is also an input to multiplexer 70, as output 74 from multiplexer 70. When adder 10 operates in the split mode of operation, there are two independent sum outputs from adder 10. The first output is comprised of output 34 and carry-out bits 36. The second output is comprised of output 74 from multiplexer 70.

In the split mode of operation, mode select input 90 takes on a first state such as a logic low. Adders 30 and 40 operate simultaneously on their respective inputs. In this manner, throughput of adder 10 is enhanced in that two independent additions are accomplished substantially simultaneously. When adder 10 operates in the split mode of operation, there are two independent sum outputs from adder 10. The first sum output is comprised of output 34 and carry-out bits 36. The second sum output is comprised of output 74 from multiplexer 70.

The output of one of adders 30 or 40 may be available at slightly different times due to the relative number of bits in the operands. In one embodiment, the number of bits in the operands of adder 30 is less than, or at least no greater that, the number of bits in the operands of adder 40. When the number of bits in the operands of adder 30 is less than the number of bits in the operands of adder 40, the sum and carry-out outputs will be available from adder 30 sooner than from adder 40. Under these conditions, the time required for code converter 80 to generate its output, select input 72, and for operation of multiplexer 70 to operate will not substantially delay availability of the final outputs from adder 10.

In the hierarchical carry-select mode of operation, mode select input 90 takes on a second state, such as a logic low or a logic high, and adder 10 performs a hierarchical carry-select addition (or subtraction). The bits representing each operand 20, 22 and 24 are split into two groups to form two new operands, each typically having multiple bits, and each having fewer bits than the original operand. Operands 20*l*, 22*l*, and 24*l* are formed from the less significant bits of multiple-bit operands 20, 22, and 24 respectively and are added in adder 30, typically with the carry-in 32 set to $00_2$. The sum of operands 20*l*, 22*l*, and 24*l* are the less significant bits of a sum of multiple-bit operands 20, 22, and 24 represented by output 34 together with carry-out bits 36.

Operands 20*h*, 22*h*, and 24*h* are formed from the more significant bits of multiple-bit operands 20, 22, and 24 respectively and are provided to and added in each of adders 40, 50, and 60. Adders 40, 50, and 60 have respective carry-ins of $00_2$, $01_2$, and $10_2$. Adders 40, 50, and 60 add the operands and produce a respective carry-in and produce a respective sum 44, 54, and 64. One of sums 44, 54, and 64 represents the more significant bits of the sum of operands 20, 22, and 24.

Mode select input 90, together with carry-out bits 36 from adder 30, are provided as inputs to code converter 80. Code converter 80 based on these inputs generates an output which is provided to multiplexer 70 to select which of inputs 44, 54, or 64 to multiplexer 70 is provided as output 74 from multiplexer 70. Output 74 includes two carry-out bits.

In the hierarchical carry-select mode of operation, mode select input 90 takes on a second state. Adders 30, 40, 50, and 60 operate substantially simultaneously on their respective inputs. In this manner, the throughput of adder 10 is enhanced in that addition of the less significant bits and the more significant bits occurs substantially simultaneously.

The outputs of adders 30, and 40, 50, and 60 may be available at slightly different times due to the relative number of less significant bits as compared to the number of more significant bits. In one embodiment, the number of bits in the operands of adder 30, the less significant bits, is less than, or at least no greater than, the number of bits in the operands of adders 40, 50, and 60, the more significant bits. When two wide bit-width operands are each split into two operands, each having a smaller bit width than the original operand, two resulting operands are formed from each original operand. The bit positions between which a split is made is arbitrary. When the number of bits in each resulting operand formed from the lesser significant bits of an original operand is less than the number of bits in the resulting operand formed from the more significant bits of the original operand, the sum and carry-out outputs from addition of the resulting operands formed from the lesser significant bits will be available from adder 30 sooner than the sum and carry-out outputs from addition of the resulting operands formed from the more significant bits from adders 40, 50, and 60. Advantage may be taken of the difference in time when the sum is available from adder 30 before the sum is available from adders 40, 50, and 60. The time difference provides time for code converter 80 to generate its output, select input 72, and for operation of multiplexer 70. A trade-off in the number of more significant bits as compared to the number of less significant bits can be made when adder 10 is being designed to have approximately the same delay in adder 30, code converter 80 and multiplexer 70 as is in adders 40, 50, and 60. In this manner, throughput through adder 10 operating in a hierarchical carry-select mode of operation can be optimized.

When adder 10 operates in the carry-select mode of operation, there is a single output from adder 10. Output 34 from adder 30 contributes the least significant bits of the output from adder 10 and is concatenated with output 74 from multiplexer 70, which contributes the more significant bits, to form the output from adder 10.

A truth table for code converter 80 is illustrated in Table 1.

TABLE 1

Code converter truth table

| Carry-out bits from less significant bit adder | | Mode Select Input | Multiplexer Select Input |
|---|---|---|---|
| 0 | 0 | 0 | 00 |
|   |   | 1 | 00 |
| 0 | 1 | 0 | 00 |
|   |   | 1 | 01 |
| 1 | 0 | 0 | 00 |
|   |   | 1 | 10 |

Code converter 80 may be implemented in combinatorial logic, as a look-up table, in software, or in any other known manner. For a three-to-one selection by multiplexer 70, two bits are required to make the selection of which input to multiplexer 70 will be presented at the output of multiplexer 70. However, with two carry-out bits 36 from adder 30, and a mode select input 90 to adder 10, three bits contain aggregate information to select the appropriate sum and therefore three inputs are provided to code converter 80. As can be seen from the truth table of code converter 80, when the mode select input is asserted, that is takes on a logic high state, indicating a hierarchical carry select mode of operation, the multiplexer select input takes on the sate of the carry-out bits 36 to select the output of one of adders 40, 50, or 60 as the output 74 of multiplexer 70, and when the mode select input is not asserted, that is takes on a logic low state, indicating a split add mode of operation, the multiplexer select input takes on a $00_2$ state to select the output of adder 40 as the output 74 of multiplexer 70. When the mode select input is asserted, the output of adder 40, 50, or 60 is selected based on the carry-out bits 36 so as to propagate the correct carry-out from adder 30, as is known in the art of hierarchical carry-select adders.

While adder 10 has been described as adding operands, adder 10 can be used to subtract one or more operands from other operands, such as by providing an operand to be subtracted in twos-complement form and adding a one through a carry-in input. Furthermore, in the split add mode of operation, the invention has been described as selecting the output of adder 40, the invention is not limited thereto. Should subtraction be performed where a carry-in of one would be utilized or if a non-zero carry-in is present, adders 50 or 60 could be selected. One skilled in the art could generate and implement a code converter to recognize such conditions and select the appropriate adder.

A schematic diagram of a more general embodiment of a multiple input hierarchical carry-select split adder 210 is illustrated in FIG. 2. The less significant j+1 bits of operands 220*l* through 224*l* are added in adder 230, with the number of carry inputs to adder 230 corresponding to the number of operands 220*l* through 224*l*. The number of operands may be any number two or greater.

The number of adders 240 through 2*n*0 is determined by the number of possible combinations of the carry-out bits from the sum of the lesser significant bits in adder 230. Typically the number of adders 240 through 2*n*0 will be $2^{k-1}-1$ adders, where k is an integer representing the number of operands provided as inputs to adder 230. When the vectors are partitioned between bits j and jtl, the more significant (m−(j+1)) bits of operands 220*l* through 224*l* are added in adders 240 through 2*n*0.

Multiplexer 270 receives as inputs the sum outputs from each of adders 240 through 2*n*0, respectively outputs 244 through 2*n*4. Select input 272 selects one of the inputs to multiplexer 270 as its output 274. Output 274 is a sum that includes an appropriate number of carry-out bits.

Code converter 280 receives the mode select input 290 as well as carry outputs 236 from adder 230, and generates as an output select input 272 to select the appropriate one of adders 240 through 2*n*0 to complete the hierarchical carry select mode addition or the split mode addition, depending on the status of the mode select input. In view of the foregoing explanation, one skilled in the art could design and implement a code converter to achieve the desired result.

What is claimed is:

1. An adder comprising:
    a first adder for receiving as inputs a plurality of operands k in number, k being an integer at least three, and k−1 carry-in inputs, the first adder providing as outputs a sum that is the sum of the k operands and the k−1 carry-in inputs, and k−1 carry-out outputs;
    a plurality of $2^{k-1}-1$ carry-select adders, each of the carry-select adders receiving a plurality of operands k in number, each of the carry-select adders having k−1 predetermined carry-in inputs, each of the carry-select adders providing as outputs a sum that is the sum of the k operands and the respective predetermined carry-in inputs;
    a multiplexer for receiving as inputs the sum outputs from the carry-select adders, the multiplexer receiving a select input to select one of the inputs of the multiplexer as an output of the multiplexer;
    a code converter for receiving as inputs a mode select input and the k−1 carry-out outputs from the first adder, the code converter causing the first adder and the carry-select adders to operate as a split adder when the mode select input takes on a first state, and the code converter causing the first adder and the carry-select adders to operate as a hierarchical carry-select adder when the mode select input takes on a second state.

2. An adder as recited in claim 1, wherein the number of bits in operands provided as inputs to the first adder is less than the number of bits in operands provided as inputs to the carry-select adders.

3. An adder as recited in claim 1, wherein k is greater than two.

4. An adder as recited in claim 3, wherein k is three.

5. An integrated circuit, including an adder comprising:
    a first adder for receiving as inputs a plurality of operands k in number, k being an integer at least three, and k−1 carry-in inputs, the first adder providing as outputs a sum that is the sum of the k operands and the k−1 carry carry-in inputs, and k−1 carry-out outputs;
    a plurality of $2^{k-1}-1$ carry-select adders, each of the carry-select adders receiving a plurality of operands k in number, each of the carry-select adders having k−1 predetermined carry-in inputs, each of the carry-select adders providing as outputs a sum that is the sum of the k operands and the respective predetermined carry-in inputs;
    a multiplexer for receiving as inputs the sum outputs from the carry-select adders, the multiplexer receiving a select input to select one of the inputs of the multiplexer as an output of the multiplexer;
    a code converter for receiving as inputs a mode select input and the k−1 carry-out outputs from the first adder, the code converter causing the first adder and the carry-select adders to operate as a split adder when the mode select input takes on a first state, and the code converter causing the first adder and the carry-select adders to operate as a hierarchical carry-select adder when the mode select input takes on a second state.

6. An integrated circuit as recited in claim 5, wherein the number of bits in operands provided as inputs to the first adder is less than the number of bits in operands provided as inputs to the carry-select adders.

7. An integrated circuit as recited in claim 5, wherein k is greater than two.

8. An integrated circuit as recited in claim 5, wherein k is three.

9. An integrated circuit as recited in claim 5, wherein the integrated circuit is a microprocessor.

10. An integrated circuit as recited in claim 5, wherein the integrated circuit is a microcontroller.

11. An integrated circuit as recited in claim 5, wherein the integrated circuit is a digital signal processor.

12. An adder, comprising:

a first adder module having a first input and a first output;

a plurality of carry-select adders in parallel with said first adder module, said plurality of carry-select adders; and a code converter having a mode select input, the code converter in a first state causing the first adder and the carry-select adders to operate as a split adder, and in a second state causing the plurality of carry-select adders to operate as a carry-select adder;

wherein said adder is capable of accommodating more than two operands as inputs.

13. The adder according to claim 12, wherein:

said plurality of carry-select adders operating as a carry-select adder operates as a hierarchical carry-select adder.

14. The adder according to claim 12, further comprising:

a multiplexer receiving as inputs sum outputs from each of said plurality of carry-select adders, said multiplexer receiving a select input to select an output from one of said plurality of carry-select adders as an output of said multiplexer.

15. The adder according to claim 12, wherein:

at least one of said plurality of carry-select adders is capable of being unpowered while at least another of said plurality of carry-select adders remains powered and operating, allowing power savings.

* * * * *